No. 738,314. PATENTED SEPT. 8, 1903.
O. P. FRITCHLE.
APPARATUS FOR PRODUCING ACTIVE MATERIAL AND ELECTRODES FOR STORAGE BATTERIES.
APPLICATION FILED JAN. 7, 1903.
NO MODEL.
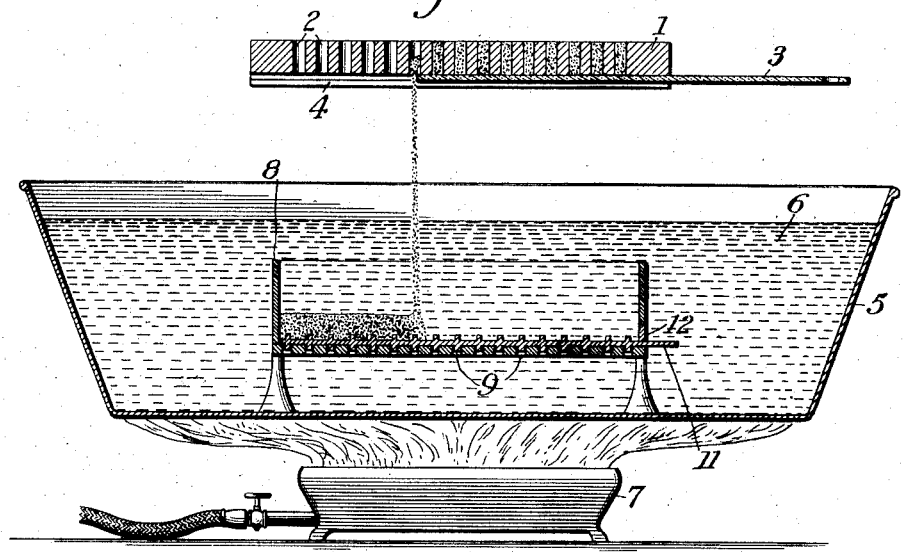
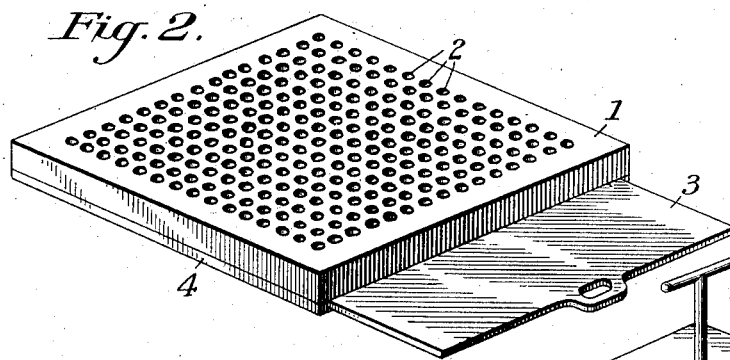
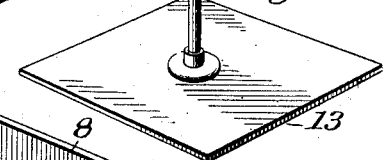
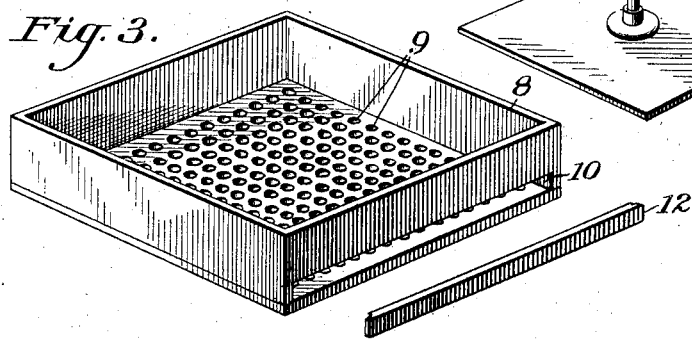
Witnesses:
R A Balderson
L. D. Hosier
Inventor:
Oliver P. Fritchle
By Byrnes & Townsend
Att'ys.

No. 738,314. Patented September 8, 1903.

UNITED STATES PATENT OFFICE.

OLIVER P. FRITCHLE, OF DENVER, COLORADO.

APPARATUS FOR PRODUCING ACTIVE MATERIAL AND ELECTRODES FOR STORAGE BATTERIES.

SPECIFICATION forming part of Letters Patent No. 738,314, dated September 8, 1903.

Application filed January 7, 1903. Serial No. 138,168. (No model.)

*To all whom it may concern:*

Be it known that I, OLIVER P. FRITCHLE, a citizen of the United States, residing at Denver, in the county of Arapahoe and State of Colorado, have invented certain new and useful Improvements in Apparatus for Producing Active Material and Electrodes for Storage Batteries, of which the following is a specification.

This apparatus is especially intended for the production of active material and electrodes by a process involving treatment of finely-divided lead with a hot dilute solution of hydrochloric acid. Such treatment causes the particles of lead to cohere, as if in molten state, and they may then be welded together into a rigid but still highly porous mass by subjecting them to light pressure.

One form of the apparatus is shown in the accompanying drawings, in which—

Figure 1 is a transverse vertical section of the entire apparatus. Fig. 2 is a perspective view of a device for holding the finely-divided lead and showering it evenly into the hot acid solution. Fig. 3 is a perspective view of a device for receiving the showered lead after treatment and which is also arranged to hold a grid or other support for the treated lead, and Fig. 4 is a perspective view of a tool for compressing the treated lead.

The apparatus comprises a device 1 for holding and showering the finely-divided lead. This device is a rectangular plate, which may be of wood or other material which is not at all or only slightly attacked by hydrochloric-acid vapor. The plate has a large number of perforations or slots 2, extending entirely through it. A slide 3 is arranged to move in contact with the lower surface of the plate and is supported by rabbeted parallel guide-strips 4, secured beneath the edges of the plate.

The vessel 5, a shallow pan of acid-proof material or lined with porcelain, contains a body of dilute hydrochloric acid 6, preferably a five-per-cent. aqueous solution. Beneath the pan is a gas-heater 7, by which the acid solution is brought to a high temperature. A receiver 8 is supported within the pan at some distance above its bottom and directly beneath the showering device 1. This receiver is a shallow rectangular tray, of material which is inert toward the acid solution, such as copper. The bottom of this receiver is detachable and has a large number of perforations 9, adapted to receive the projections on the grid, allowing the body of the grid to lie flat on the bottom of the receiver. A horizontal slot 10 is cut through one wall of the receiver at or slightly above the inner surface of its bottom, through which may be inserted a grid or plate 11 to receive the treated lead. A strip 12 closes the slot. In employing this apparatus the receiver 8, containing the grid 11, is placed in the pan 5, and the acid solution is heated to a high temperature, preferably to its boiling-point. The apertures in plate 1 are filled with the granulated lead, previously sieved to a size between sixty and one hundred mesh, the slide being closed, and the device is held, by hand or otherwise, directly above the receiver 8, as shown in Fig. 1. The slide is now slowly withdrawn, and the lead falls through the hot acid solution into the receiver and onto the grid 11. The action of the acid solution on the granulated lead quickly causes it to become coherent, as if in a molten state, and the treated mass will occupy about four times the original volume of the lead. The lead is now compressed to about twice its original volume, preferably while it is still within the hot solution. It is important that the treated lead should be compressed without delay, as its property of welding is soon destroyed by the continued action of the acid. The pressure required is comparatively slight, depending upon the required porosity of the mass, and may be effected by the hand-tool 13 or by a hand-press with screw or toggle mechanism. The bottom of the receiver is now removed, and the grid with the compressed active material on one of its faces is pushed out and again inserted with the active material below. The bottom is replaced, and the other face of the grid is provided with a coating of active material by repeating the described operations.

The receiver shown and described is especially intended for use in connection with a conducting or non-conducting grid or support to receive the active material. The provision of such grid is often unnecessary. The granulated lead after passing through the acid may be received directly on the bottom of any suitable vessel and compressed into a highly-porous and self-supporting electrode of sufficient rigidity for practical use.

The apparatus will be found useful for the treatment of any finely-divided material with any liquid and the recovery of the treated product.

The process of producing active material and electrodes for lead storage batteries for which this apparatus is specially designed is claimed in my application, Serial No. 138,167, of even date herewith.

I claim—

1. An apparatus for treating finely-divided material with a liquid, comprising a vessel for the liquid, and a device for holding the finely-divided material and showering it into the liquid, said device consisting of a plate having a plurality of apertures and a slide in contact with one surface of the plate, as set forth.

2. An apparatus for treating finely-divided material with a liquid, comprising a vessel for the liquid, a device for holding the finely-divided material and showering it into the liquid, and a receiver supported in said vessel above its bottom, as set forth.

3. An apparatus for treating finely-divided material with a liquid, comprising a vessel for the liquid, a device for holding the finely-divided material and showering it into the liquid, said device consisting of a plate having a plurality of apertures and a slide in contact with one surface of the plate, and a receiver supported in said vessel above its bottom, as set forth.

4. An apparatus for treating finely-divided material with a liquid, comprising a vessel for the liquid, a device for holding the finely-divided material and showering it into the liquid, and a receiver supported in said vessel above its bottom, said receiver having a perforated bottom and a slot in its side, as set forth.

5. An apparatus for treating finely-divided material with a liquid, comprising a vessel for the liquid, a device for holding the finely-divided material and showering it into the liquid, said device consisting of a plate having a plurality of apertures and a slide in contact with one surface of the plate, and a receiver arranged in said vessel above its bottom, said receiver having a perforated bottom and a slot in its side, as set forth.

6. An apparatus for treating finely-divided material with a liquid, comprising a vessel for the liquid, means for heating the vessel and its contents, and a device for holding the finely-divided material and showering it into the liquid, said device consisting of a plate having a plurality of apertures and a slide in contact with one surface of the plate, as set forth.

7. An apparatus for treating finely-divided material with a liquid, comprising a vessel for the liquid, means for heating the vessel and its contents, a device for holding the finely-divided material and showering it into the liquid, and a receiver arranged in said vessel above its bottom, as set forth.

8. A device for holding and showering finely-divided material, consisting of a plate having a plurality of apertures, and an imperforate slide in contact with one surface of the plate, as set forth.

9. A device for holding an electrode-support and receiving active material, consisting of a vessel having a perforated bottom and a horizontal slot extending through the side of the vessel near its bottom, as set forth.

10. A device for holding an electrode-support and receiving active material, consisting of a vessel having a perforated bottom, a horizontal slot extending through the side of the vessel near its bottom, and a closure for said slot, as set forth.

11. An apparatus for producing electrodes for storage batteries, comprising a vessel for holding a liquid, a device for showering finely-divided material into the liquid, and means for compressing the treated material while in the liquid, as set forth.

12. An apparatus for producing electrodes for storage batteries, comprising a vessel for holding a liquid, means for showering finely-divided material into the liquid, a receiver supported in said vessel above its bottom, and means for compressing the treated material while in said receiver, as set forth.

13. An apparatus for producing electrodes for storage batteries, comprising a vessel of material which is inert toward hydrochloric acid, and means for showering finely-divided material into the vessel, as set forth.

14. An apparatus for producing electrodes for storage batteries, comprising a vessel and a device for showering finely-divided material into the vessel, said vessel and device constructed of material which is inert toward hydrochloric acid, as set forth.

15. An apparatus for producing electrodes for storage batteries, comprising a vessel, a receiver, and a device for showering finely-divided material into the receiver, said vessel, receiver and device constructed of material which is inert toward hydrochloric acid, as set forth.

In testimony whereof I affix my signature in presence of two witnesses.

OLIVER P. FRITCHLE.

Witnesses:
W. H. GOETZMAN,
SARAH STINSON.